(12) United States Patent
Kim et al.

(10) Patent No.: US 10,033,240 B2
(45) Date of Patent: Jul. 24, 2018

(54) MOTOR AND POWER TRANSMISSION APPARATUS INCLUDING THE SAME

(71) Applicant: LG INNOTEK CO., LTD., Seoul (KR)

(72) Inventors: Seong Jin Kim, Seoul (KR); Kyung Sang Park, Seoul (KR); Chang Hyun Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 369 days.

(21) Appl. No.: 14/836,185

(22) Filed: Aug. 26, 2015

(65) Prior Publication Data

US 2016/0065028 A1 Mar. 3, 2016
US 2017/0373554 A9 Dec. 28, 2017

(30) Foreign Application Priority Data

Aug. 27, 2014 (KR) .................. 10-2014-0112570

(51) Int. Cl.
*H02K 5/04* (2006.01)
*H02K 5/22* (2006.01)
*H02K 7/116* (2006.01)

(52) U.S. Cl.
CPC .............. *H02K 5/04* (2013.01); *H02K 5/22* (2013.01); *H02K 5/225* (2013.01); *H02K 7/116* (2013.01); *H02K 7/1166* (2013.01)

(58) Field of Classification Search
CPC .......... H02K 5/148; H02K 7/081; H02K 7/11; H02K 7/116; H02K 7/1166; B62D 5/0406; B62D 5/0409; B62D 5/0421; B66B 11/04; B66B 11/044; B66B 11/0446; E05F 15/697; F16C 23/10; F16C 25/08; F16C 25/083; F16C 27/066; F16C 35/02; F16C 35/073; F16H 1/16; F16H 55/24; F16H 57/021
See application file for complete search history.

(56) References Cited

U.S. PATENT DOCUMENTS 4,227,104 A * 10/1980 Hamman ................ F16C 35/02
310/75 R
4,399,380 A * 8/1983 Hirano ...................... B60S 1/08
15/250.3
5,015,897 A * 5/1991 Inagaki .................. H02K 5/148
310/239

(Continued)

FOREIGN PATENT DOCUMENTS

DE 10246391 A1 10/2002
DE 102013003165 A1 9/2013
WO WO-9965758 A1 12/1999

OTHER PUBLICATIONS

European Search Report dated Jun. 28, 2016 in European Application No. 15182661.7.

*Primary Examiner* — Tran Nguyen
(74) *Attorney, Agent, or Firm* — Saliwanchik, Lloyd & Eisenschenk

(57) ABSTRACT

Disclosed is a motor including a housing, a stator arranged in the housing, a rotor unit arranged in the housing to rotate with the stator unit, and a rotating shaft rotating along with the rotor unit, wherein the housing includes a first housing in which the stator unit and the rotor unit are arranged, a second housing in which one end of the rotating shaft is arranged, and a third housing connected with the second housing.

10 Claims, 4 Drawing Sheets

(56) References Cited

U.S. PATENT DOCUMENTS

| | | | | |
|---|---|---|---|---|
| 5,144,738 | A | * | 9/1992 | Oyafuso .................. F16C 17/08 |
| | | | | 29/596 |
| 6,172,436 | B1 | * | 1/2001 | Subler .................. F16C 33/6662 |
| | | | | 29/898.11 |
| 6,288,464 | B1 | * | 9/2001 | Torii ...................... H02K 7/108 |
| | | | | 192/223.2 |
| 6,357,313 | B1 | * | 3/2002 | Appleyard ........... B62D 5/0409 |
| | | | | 384/255 |
| 6,390,264 | B2 | * | 5/2002 | Torii .................... E05F 11/505 |
| | | | | 192/223.2 |
| 7,100,469 | B2 | | 9/2006 | Takechi |
| 7,243,569 | B2 | * | 7/2007 | Takahashi ........... B62D 5/0403 |
| | | | | 74/388 PS |
| 7,707,903 | B2 | * | 5/2010 | Kobayashi ............ F16H 63/304 |
| | | | | 74/34 |

* cited by examiner

MOTOR AND POWER TRANSMISSION APPARATUS INCLUDING THE SAME

CROSS-REFERENCE TO RELATED APPLICATION

This application claims the benefit under 35 U.S.C. § 119 of Korean Patent Application No. 10-2014-0112570, filed Aug. 27, 2014, which is hereby incorporated by reference in its entirety.

BACKGROUND

Field of the Invention

The present invention relates to a motor.

Discussion of Related Art

Generally, a motor has a stator arranged on an inner circumferential surface of a housing, and a rotor arranged in the center of a stator. The rotor is configured to transfer power to the outside by rotating according to an electromagnetic interaction with the stator.

For example, in a brake system of a vehicle, a gear is rotated by rotation of a motor, and a master cylinder is pressurized, and thus a brake is operated.

However, there is a problem in that, when a gear box is separately assembled on the motor, assembling becomes complicated, and the number of components, for example a fastening component, is increased, and thus manufacturing costs are increased.

Also, there is a problem in that a clearance is generated between the gear and a rotating shaft of the motor at the time of assembling and thus reliability is deteriorated.

BRIEF SUMMARY

The present invention is directed to providing a motor capable of mounting a gear.

According to an aspect of the present invention, there is provided a motor including a housing: a stator unit arranged in the housing: a rotor unit arranged in the housing to rotate with the stator unit; and a rotating shaft rotating along with the rotor unit, wherein the housing includes a first housing in which the stator unit and the rotor unit are arranged; a second housing connected with the first housing and in which one end of the rotating shaft is arranged; and a third housing connected with the second housing.

According to an aspect of the present invention, the motor may include a first through hole formed on a bottom surface of the first housing to connect the first housing and the second housing; and a second through hole formed on a side surface of the third housing to connect the second housing and the third housing.

According to an aspect of the present invention, extension directions of the first and second housings may be parallel to each other, and an extension direction of the first housing and an extension direction the third housing may be orthogonal to each other.

According to an aspect of the present invention, the motor may include a groove formed on the bottom surface of the third housing; and a third through hole connected with the groove. An extension direction of the groove may be parallel to the extension direction of the first housing.

According to an aspect of the present invention, the motor may include a cover configured to seal an accommodation groove.

In the motor according to an aspect of the present invention, the cover may include a plurality of first fastening portions formed along an outer circumferential surface and coupled to the housing.

In the motor according to an aspect of the present invention, the cover may include a plurality of second fastening portions arranged between the plurality of first fastening portions.

In the motor according to an aspect of the present invention, the rotating shaft may include a screw thread formed on one end thereof.

According to an aspect of the present invention, there is provided a power transmission apparatus including a housing; a stator unit arranged in the housing; a rotor unit arranged in the housing to rotate with the stator unit; a rotating shaft rotating along with the rotor unit; and a first gear connected with the rotating shaft to rotate, wherein the housing includes a first housing in which the stator unit and the rotor unit are arranged; a second housing connected with the first housing and in which one end of the rotating shaft is arranged; and a third housing which is connected with the second housing and in which the first gear is arranged.

According to an embodiment, the gear is mounted on the housing of the motor, thereby being easily assembled and miniaturized.

Also, a separate gear box and a separate fastening component are omitted, and thus an assembling process is simplified and manufacturing costs are reduced.

Various and beneficial advantages and effects are not limited to the described embodiment, and will be more easily understood in a process of describing an embodiment of the present invention in detail.

DETAILED DESCRIPTION OF EXEMPLARY EMBODIMENTS

Figure 1:
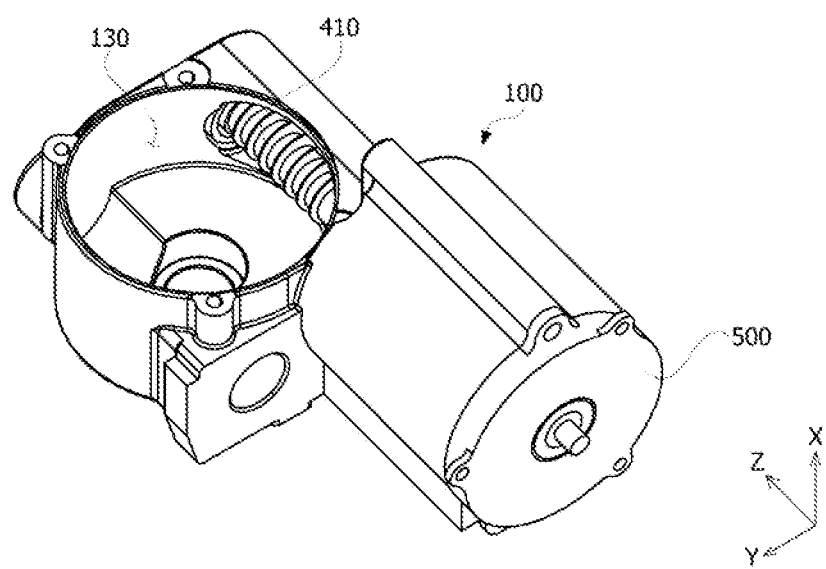
FIG. 1 is a perspective view of a motor according to an exemplary embodiment of the present invention.

Although the present invention can be modified variously and have several embodiments, the exemplary embodiments are illustrated in the accompanying drawings and will be described. However, the present invention is not limited to the specific embodiments and should be construed as including all the changes, equivalents, and substitutions included in the spirit and scope of the present invention.

Terms used in the specification, 'first', 'second', etc. can be used to describe various components, but the components are not to be construed as being limited to the terms. The terms are only used to differentiate one component from other components. For example, the 'second' component may be named the 'first' component and the 'first' component may also be similarly named the 'second' component, without departing from the scope of the present invention. The term 'and/or' includes a combination of a plurality of items or any one of a plurality of terms.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, embodiments of the present invention will be described with reference to the accompanying drawings, but like reference numerals refer to like components and overlapping descriptions thereof will be omitted.

Figure 2:
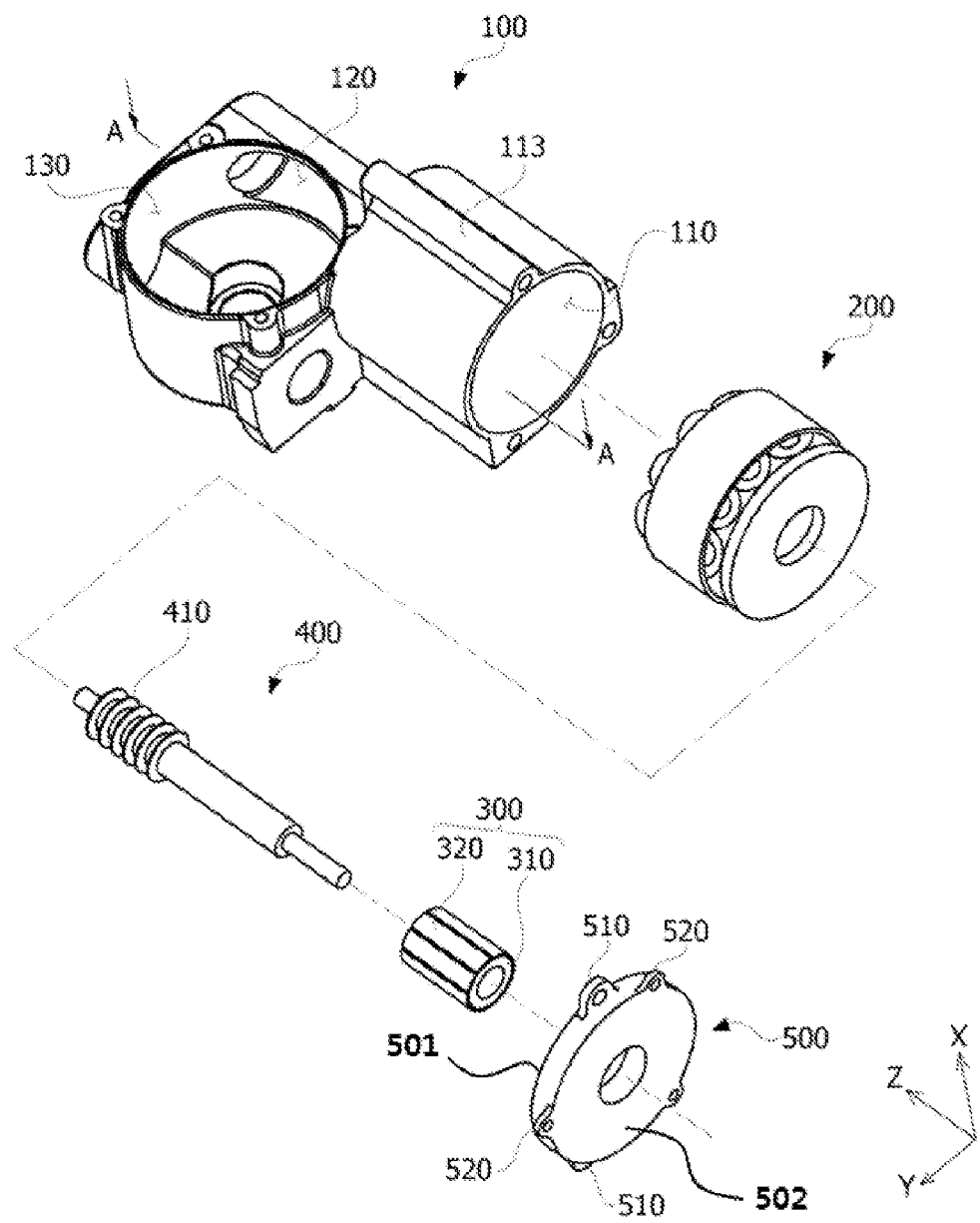
FIG. 2 is an exploded perspective view of the motor according to an exemplary embodiment of the present invention.
Figure 3:
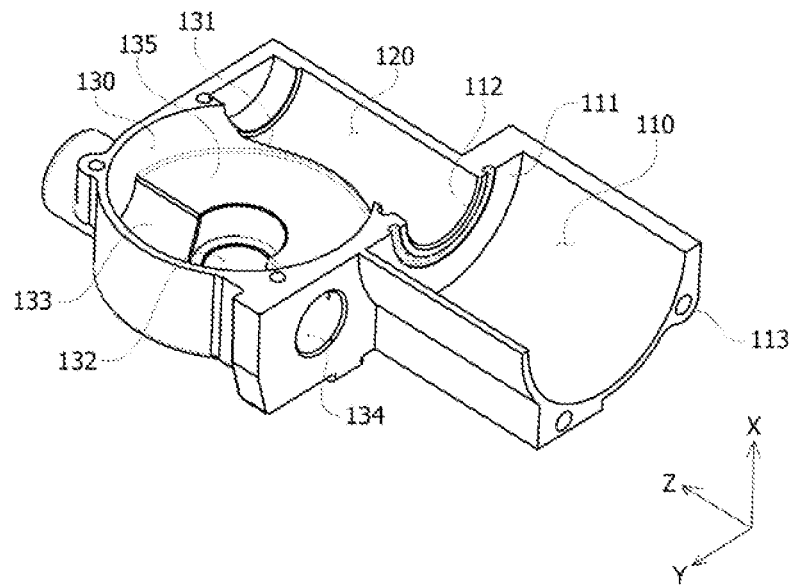
FIG. 3 is a cross-sectional view shown in a direction of A-A of the housing in FIG. 2.

FIG. 1 is a perspective view of a motor according to an exemplary embodiment of the present invention, and FIG. 2 is an exploded perspective view of the motor according to an exemplary embodiment of the present invention, and FIG. 3 is a cross-sectional view shown in a direction of A-A of the housing in FIG. 2.

Referring to FIGS. 1 and 2, the motor according to the present invention includes a housing 100, a stator unit 200 arranged in the housing 100, a rotor unit 300 arranged in the housing 100 to rotate about the stator unit 200, a rotating shaft 400 rotating along with the rotor unit 300, and a cover 500 coupled to the housing 100.

The housing 100 includes a first housing 110 in which the stator unit 200 and the rotor unit 300 are arranged, a second housing 120 in which one end of the rotating shaft 400 is arranged, and a third housing 130 in which a gear is accommodated. The second housing 120 may be a passage connecting the first housing 110 with the third housing 130.

The first housing 110 has open one side, which the stator unit 200 and the rotor unit 300 may be inserted thereinto. The first housing 110 may have a cylinder shape with a size in which the stator unit 200 can be inserted and fixed.

The second housing 120 may have one end of the rotating shaft 400 inserted through the first housing 110 to be arranged therein. Therefore, the second housing 120 may be extended from the one side of the first housing 110. A diameter of the second housing 120 may be less than that of the first housing 110.

The third housing 130 may provide a space in which the gear may be mounted. An extension direction (Z-direction) of the first housing 110 and an extension direction (X-direction) of the third housing 130 may be arranged to be orthogonal to each other. That is, an open plane (XY plane) of the first housing 110 and the open plane (YZ plane) of the third housing 130 may be arranged to be orthogonal to each other.

The housing 100 may be a single component in which the first housing 110, the second housing 120, and the third housing 130 are integrally formed. The housing 100 may be manufactured by injection molding. According to an exemplary embodiment, the first housing 110, the second housing 120, and the third housing 130 are integrally formed in the housing 100 as a single component, thereby having a simple structure and being easily manufactured.

The stator unit 200 may have a well-known shape in which a coil is wound around a stator core. The stator unit 200 may have a structure in which a coil is wound around an integrated stator core or around a plurality of divided cores.

The rotor unit 300 includes a cylindrical rotor core 310 and a plurality of magnets 320 attached to the rotor core 310. The rotor unit 300 may be rotated due to an electromagnetic interaction with the stator unit 200.

The rotating shaft 400 may be integrally rotated with the rotor unit 300 by being inserted into and fixed to the rotor unit 300. A screw thread 410 is formed at one end of the rotating shaft 400, so the rotating shaft is interlocked with the gear to be described below and rotated. Opposite ends of the rotating shaft 400 may be supported on a bearing.

A cover 500 may be coupled to the first housing 110 to accommodate the stator unit 200 and the rotor unit 300. The cover 500 is formed in a disk shape, and may have a plurality of first fastening portions 510 and a plurality of second fastening portions 520 formed along an outer circumferential surface. The first fastening portion 510 and the second fastening portion 520 may be alternately arranged along an outer circumferential surface.

The first fastening portions 510 may be arranged on the same plane as a first plane 501 that the cover 500 faces the first housing 110. The first fastening portion 510 may be screw-coupled to a third fastening portion 113 formed on an outer circumferential surface of the housing 100. Also, a second fastening portion 520 may be arranged on the same plane as a second plane 502 facing the first plane 501.

Referring to FIG. 3, the first housing 110 may be connected with a second housing 120 through a first through hole 112 formed in a bottom surface 111. Therefore, the one end of the rotating shaft 400 inserted into the first housing 110 is arranged on the second housing 120 to pass through the first housing 110.

The third housing 130 may be connected with the second housing 120 through a second through hole 131 formed in a side surface of the third housing 130. The third housing 130 may include a concave groove 132 formed in the center of a bottom surface 135 and a groove 133 crossing the concave groove 132. An extension direction of the concave groove 132 and an extension direction of the groove 133 are orthogonal to each other.

The groove 133 may be connected with the third through hole 134 formed on a side wall of the third housing 130 by extending in a direction (Z-direction) parallel to the extension direction of the first housing 110.

The third housing 130 may accommodate a plurality of gears interlocked with the rotating shaft 400 of the motor and rotating. An accommodation space of the motor and an accommodation space of the gear are simultaneously provided in one housing, so the third housing may be miniaturized as compared with when a separate gear box is coupled to a motor housing.

Figure 4:
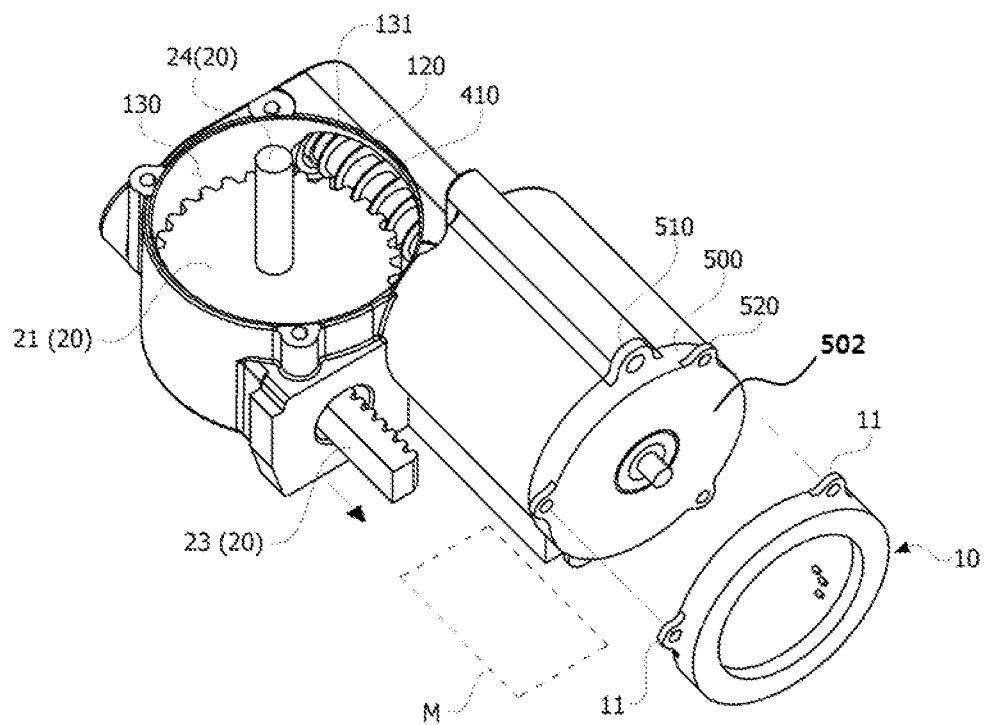
FIG. 4 is a conceptual view of a power transmission apparatus according to an exemplary embodiment of the present invention.
Figure 5:
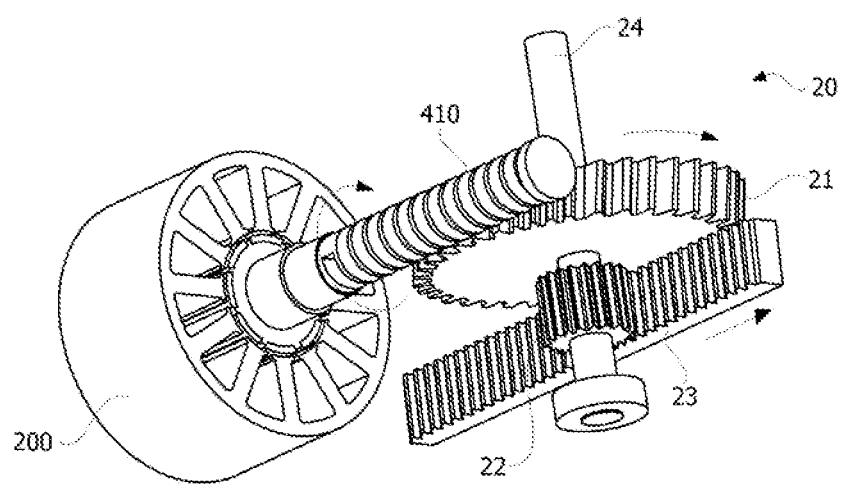
FIG. 5 is a conceptual view illustrating a structure in which the power transmission apparatus according to an exemplary embodiment of the present invention transmits power.

FIG. 4 is a conceptual view of a power transmission apparatus according to an exemplary embodiment of the present invention, and FIG. 5 is a conceptual view illustrating a structure in which the power transmission apparatus according to an exemplary embodiment of the present invention transmits.

Referring to FIGS. 3 to 5, the power transmission apparatus according to the present invention includes a housing 100, a stator unit 200 arranged in the housing 100, a rotor unit 300 arranged in the housing 100 to rotate with the stator unit 200, a rotating shaft 400 rotating along with the rotor unit 300, and a gear assembly 20 connected with the rotating shaft and rotating.

A structure and motor component of the housing 100 is the same as that described above, so more description will be omitted.

The gear assembly 20 includes a main gear 21 interlocked with a screw thread 410 of the rotating shaft 400 and rotating, a sub-gear 22 coupled to and integrally rotating with the main gear 21, and a motion member 23 straightly moved by rotation of the sub-gear 22.

The main gear 21 is interlocked with the screw thread 410 of the rotating shaft 400 and rotates. The third housing 130 on which the main gear 21 is arranged and the second housing 120 on which the screw thread 410 of the rotating shaft 400 is arranged are connected through a second through hole 131, and thus the main gear 21 and the rotating shaft 400 are interworked.

The sub-gear 22 is rotated along with the main gear 21 by a rotating shaft 24. The sub-gear 22 is arranged in the concave groove 132 formed on the bottom surface 135 of the third housing 130. The motion member 23 is arranged in the groove 133 formed on the bottom surface 135 of the third housing 130. The sub-gear 22 may be a rack gear, and the motion member 23 may be a pinion gear, but the present invention is not limited thereto.

The motion member 23 is straightly moved by rotation of the sub-gear 22 and may pressurize a master cylinder M of the brake system at the time of straight motion. The brake system may be operated by the pressurization of the master cylinder M.

Referring to FIG. 4, the second fastening portion 520 of the cover 500 may be coupled to a fourth fastening portion 11 of a control module 10. Therefore, the second fastening portion 520 may be arranged on the same plane as the second plane 502 that the cover 500 faces the control module 10.

One or more of electronic components among an inverter operating the motor, a power connector, and a magnetic sensor may be installed in the control module 10. For example, the control module 10 may apply three phase power to the stator unit using the inverter installed therein. Alternatively, the control module detects rotation of the rotating shaft using a magnetic sensor or a circuit substrate installed therein, thereby detecting the location of the rotor.

The cover 500 is coupled to the housing 100 by the first fastening portion 510 and is coupled to the control module 10 by the second fastening portion 520, and thus the power transmission apparatus according to the present invention has the virtue of having a simplified and compacted structure.

DESCRIPTION OF SYMBOLS

100: housing
110: first housing
120: second housing
130: third housing
200: stator unit
300: rotor unit
400: rotating shaft
410: screw thread

What is claimed is:

1. A motor, comprising:
a housing;
a stator unit arranged in the housing;
a rotor unit arranged in the housing; and
a rotating shaft configured to rotate along with the rotor unit;
wherein the housing comprises:
a first housing in which the stator unit and the rotor unit are arranged;
a second housing connected with the first housing and in which one end of the rotating shaft is arranged; and
a third housing in which a first gear and a motion member are arranged, the third housing being connected with the second housing;
wherein the third housing comprises a groove formed on a bottom surface of the third housing, and a third through hole communicating with the groove;
wherein an extension direction of the groove is in parallel to an extension direction of the rotating shaft, and
wherein the motion member is arranged in the groove and passes through the third through hole.

2. The motor of claim 1, further comprising:
a first through hole through which the first housing communicates with the second housing; and
a second through hole through which the second housing communicates with the third housing.

3. The motor of claim 1, wherein extension directions of the first and second housings are in parallel, and an extension direction of the first housing and an extension direction of the third housing cross each other.

4. The motor of claim 1, wherein an axis of the first gear extends vertically with respect to an axis of the motion member.

5. The motor of claim 1, further comprising a cover coupled to the first housing.

6. The motor of claim 5, wherein the cover comprises a plurality of first fastening portions formed on an outer circumferential surface of the cover and coupled to the first housing.

7. The motor of claim 6, wherein the cover further comprises a plurality of second fastening portions arranged between adjacent first fastening portions of the plurality of first fastening portions.

8. The motor of claim 1, wherein the rotating shaft comprises a screw thread formed on one end of the rotating shaft.

9. The motor of claim 7, further comprising a control module coupled to the plurality of second fastening portions of the cover.

10. The motor of claim 4, wherein the motion member and the rotating shaft are arranged to be in parallel.

* * * * *